US008783526B2

(12) United States Patent
Strobel-Schmidt et al.

(10) Patent No.: US 8,783,526 B2
(45) Date of Patent: Jul. 22, 2014

(54) DISPENSER FOR DISPENSING THE CONTENTS OF CARTRIDGES WITH ACTUATION LEVER

(75) Inventors: Rainer Strobel-Schmidt, Bad Woerishofen (DE); Christian Hefele, Breitenbrunn (DE); Peter Ostermeier, Diessen (DE); Hans Peter Lederle, Durach (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 13/409,368

(22) Filed: Mar. 1, 2012

(65) Prior Publication Data

US 2012/0273528 A1 Nov. 1, 2012

(30) Foreign Application Priority Data

Mar. 2, 2011 (DE) ........................ 10 2011 004 967

(51) Int. Cl.
*G01F 11/00* (2006.01)

(52) U.S. Cl.
USPC .......................................... 222/391; 222/327

(58) Field of Classification Search
USPC ............ 222/391, 392, 326, 327, 137, 153.13; 81/9.3
See application file for complete search history.

(56) References Cited

U.S. PATENT DOCUMENTS

| | | | | |
|---|---|---|---|---|
| 2,138,045 | A * | 11/1938 | Seeberger | 74/148 |
| 3,029,653 | A * | 4/1962 | Nilsson | 74/169 |
| 4,289,257 | A * | 9/1981 | Herb et al. | 222/146.5 |
| 4,339,058 | A * | 7/1982 | Wendt | 222/309 |
| 4,390,115 | A * | 6/1983 | Bigham | 222/326 |
| 4,566,610 | A * | 1/1986 | Herb | 222/137 |
| 4,994,065 | A | 2/1991 | Gibbs et al. | |
| 5,370,282 | A * | 12/1994 | Sedlmeier | 222/391 |
| 5,390,831 | A * | 2/1995 | Schneider | 222/391 |
| 5,823,403 | A * | 10/1998 | Schneider | 222/391 |
| 6,050,453 | A * | 4/2000 | Kelders et al. | 222/153.13 |
| 6,412,667 | B1 * | 7/2002 | Huang | 222/327 |
| 6,938,804 | B2 * | 9/2005 | Chen | 222/391 |
| 7,093,518 | B2 * | 8/2006 | Gmeilbauer | 81/9.3 |
| 7,096,832 | B2 * | 8/2006 | Grazioli et al. | 123/46 SC |
| 2002/0092871 | A1 * | 7/2002 | Rickard et al. | 222/327 |
| 2005/0006141 | A1 | 1/2005 | Stillabower | |
| 2009/0134187 | A1 | 5/2009 | Hefele | |
| 2009/0314809 | A1 * | 12/2009 | Lederle et al. | 222/392 |

FOREIGN PATENT DOCUMENTS

| | | |
|---|---|---|
| DE | 30 31 939 A1 | 4/1982 |
| DE | 19704627 | 8/1998 |
| DE | 19737683 | 2/1999 |
| DE | 10 2007 057 111 | 5/2009 |
| EP | 0 854 760 B1 | 7/1998 |

* cited by examiner

*Primary Examiner* — Frederick C Nicolas
*Assistant Examiner* — Bob Zadeh
(74) *Attorney, Agent, or Firm* — Davidson, Davidson & Kappel, LLC

(57) ABSTRACT

A dispenser (10) for dispensing the contents of cartridges (12), including an advancing mechanism (14) for a piston rod (16), a housing (18) on which a transmission lever (20) for actuating the advancing mechanism (14) is attached so as to swivel, and a handle (22), which is affixed to the housing and to which an actuation lever (24) is attached so as to swivel, whereby the transmission lever (20) and the actuation lever (24) are connected to each other in an articulated manner via a sliding block guide (26).

6 Claims, 2 Drawing Sheets

DISPENSER FOR DISPENSING THE CONTENTS OF CARTRIDGES WITH ACTUATION LEVER

This claims the benefit of German Patent Application DE 10 2011 004 967.3, filed Mar. 2, 2011 and hereby incorporated by reference herein.

BACKGROUND

The invention relates to a dispenser for dispensing the contents of cartridges, comprising an advancing mechanism for a piston rod, a housing on which a transmission lever for actuating the advancing mechanism is attached so as to swivel, and a handle, which is affixed to the housing and to which an actuation lever is attached so as to swivel.

Such dispensers are used, for example, in the construction sector to dispense the contents of cartridges that are filled with silicon or other liquid or viscous construction materials. These cartridges normally have a cylindrical body with a dispensing opening in one of the end walls. The opposite end wall is formed by a plunger that can be moved in the cylindrical body, meaning that moving this end wall changes the volume of the cartridge so that the contents of the cartridge can be expelled out of the dispensing opening. The dispenser allows a precise dosing as well as a precise application of the construction material in question. Normally, the dispenser has a piston that is arranged on a piston rod and that can engage with the plunger and force it against the dispensing opening in order to dispense the contents of cartridge. The piston rod is driven by means of an advancing mechanism that is actuated, for example, by a transmission lever that is attached to a housing so as to swivel. This transmission lever is normally coupled to an actuation lever that is attached to a handle, which is affixed to a housing, so as to swivel.

In the case of conventional dispensers, with each stroke of the actuation lever, an essentially constant volume of construction material is dispensed. In this process, in order to dispense the construction material, the operator has to exert a force that is a function of the viscosity of the construction material. With fairly high-viscosity construction materials, this can cause the operator to quickly become fatigued or he might not even be able to exert the requisite dispensing force. In the case of fairly low-viscosity construction materials, however, the requisite dispensing force is low, and many users have expressed the wish to be able to increase the volume of construction material dispensed per stroke.

In order to overcome this drawback of conventional dispensers, European patent specification EP 0 854 760 B1 discloses a generic dispenser with which the operator can use a knob to continuously adjust the transmission ratio between a stroke of the actuation lever and the volume of construction material dispensed. The continuous setting of the transmission ratio by means of a thread, however, is very time-consuming, especially if a switch-over from one end position (e.g. very high-viscosity construction material) to the other end position (e.g. very low-viscosity construction material) has to be carried out. Moreover, such a continuous fine adjustment of the transmission ratio is usually neither desired nor necessary. As a rule, a two-stage (small/large transmission) or three-stage (small/medium/large transmission) setting would be perfectly satisfactory. Furthermore, the devices employed, especially in the construction sector, are often highly stressed, so that the thread soon becomes difficult to adjust due to dirt or corrosion, or in extreme cases, no longer allows any adjustment at all.

SUMMARY OF THE INVENTION

It is an object of the present invention to provide a durable and sturdy dispenser with which the volume of construction material dispensed per stroke of the actuation lever can be changed simply and quickly.

The present invention provides a dispenser of the above-mentioned type, in which the transmission lever and the actuation lever are connected to each other in an articulated manner by means of a sliding block guide. The coupling of the two levers via a sliding block guide is very well-suited for providing an at least two-stage, sturdy and fast setting possibility of the transmission ratio between the stroke of the actuation lever and the volume of construction material dispensed.

In one embodiment, the sliding block guide comprises a sliding block in the transmission lever, a sliding block in the actuation lever, and a slide block peg, whereby the slide block peg engages with the sliding block of the transmission lever as well as with the sliding block of the actuation lever.

In this embodiment, the slide block peg can be configured as a guide pin and the sliding blocks can be configured as slots. For production-related reasons, such a construction is easy to achieve, it allows a quick manual setting, and moreover, it is extremely sturdy.

Preferably, the sliding block of the swiveling actuation lever, relative to its swivel bearing which is affixed to the housing, extends along the actuation lever essentially in the radial direction.

Analogously, the sliding block of the swiveling transmission lever, relative to its swivel bearing which is affixed to the housing, can extend essentially in the radial direction along the transmission lever.

In another embodiment, the swiveling actuation lever has an adjusting slide that, relative to the swivel bearing of the actuation lever which is affixed to the housing, can be moved between a radially inner, first adjustment position and a radially outer, second adjustment position. Thanks to this adjusting slide, the transmission ratio between the stroke of the actuation lever and the volume of construction material dispensed can vary quite simply, namely, by means of just one operation.

The adjusting slide preferably comprises a slide block peg of the sliding block guide.

Moreover, the adjusting slide can be locked in at least one adjustment position.

For this purpose, the sliding block of the actuation lever preferably has an undercut with which the slide block peg can engage, especially by latching. Due to the undercut, the adjusting slide can be affixed and thus a desired transmission ratio can be established in a simple manner. Such an undercut is normally provided in the radially inner, first adjustment position and/or in the radially outer, second adjustment position of the adjusting slide. Furthermore, however, it is also conceivable for such an undercut to be provided in a middle position between the first and second adjustment positions, for example, in order to provide a three-stage adjustability.

In particular, the actuation lever can be coupled to the transmission lever via the sliding block guide in such a way that, when the adjusting slide is moved from its first adjustment position into its second adjustment position, the slide block peg moves closer to the swiveling bearing of the transmission lever, which is affixed to the housing.

In an embodiment of the dispenser, the advancing mechanism has a clamping disc, whereby the transmission lever can engage with the clamping disc.

In an alternative embodiment of the dispenser, the advancing mechanism is a ratchet mechanism, whereby the transmission lever can engage with a drive wheel of the ratchet mechanism.

BRIEF DESCRIPTION OF THE DRAWINGS

Additional features and advantages of the invention can be gleaned from the description of a preferred embodiment given below and making reference to the drawings. These show the following.

DETAILED DESCRIPTION

Figure 1:
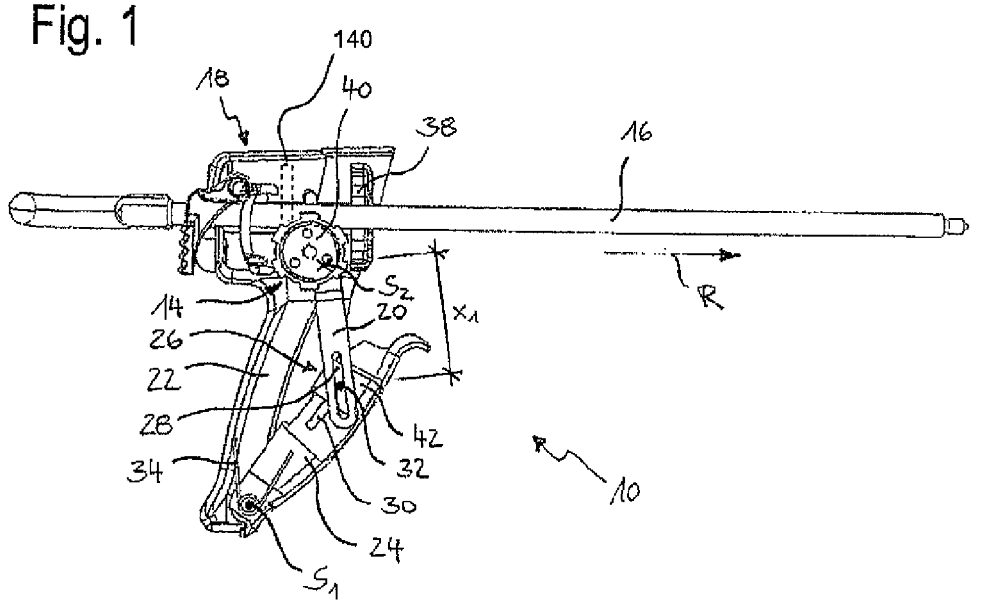
FIG. 1 a sectional view of a dispenser according to the invention, whereby an adjusting slide is in a radially outer, first adjustment position.

FIGS. 1 to 4 each show a dispenser 10 for dispensing the contents of cartridges 12 (indicated in FIG. 2), comprising an advancing mechanism or advancer 14 for a piston rod 16, a housing 18 on which a transmission lever 20 for actuating the advancing mechanism 14 is attached so as to swivel, and a handle 22, which is affixed to the housing 18 and on which an actuation lever 24 is attached so as to swivel.

Figure 3:
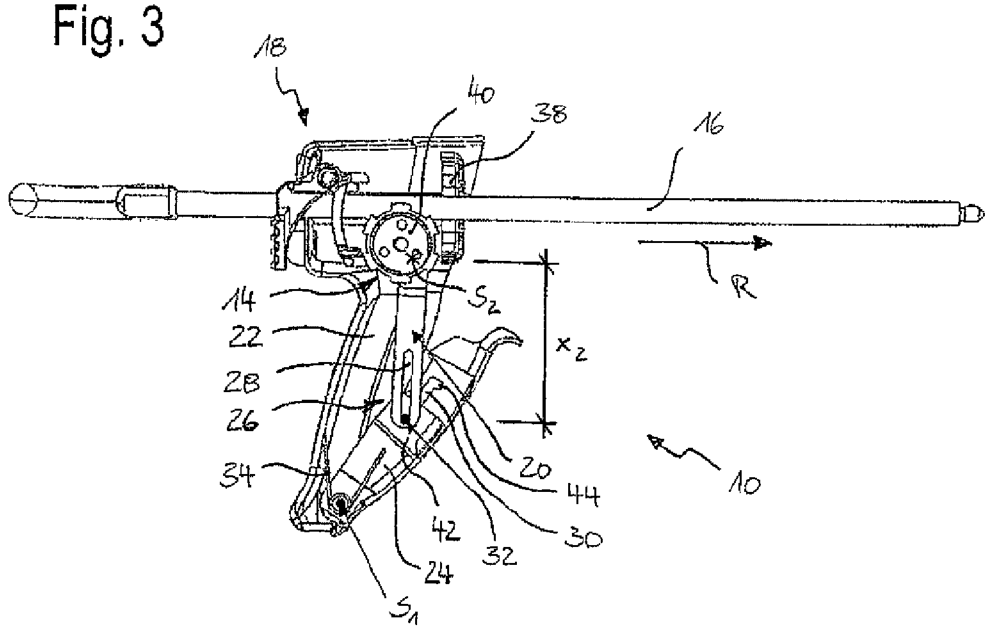
FIG. 3 a sectional view of the dispenser according to the invention, whereby the adjusting slide is in a radially inner, second adjustment position.

In the schematic sectional views of FIGS. 1 and 3, it is clear that the transmission lever 20 and the actuation lever 24 are connected to each other in an articulated manner by means of a sliding block guide 26. The sliding block guide 26 comprises a sliding block configured as a slot 30 in the actuation lever 24 as well as a slide block peg configured as a guide pin 32, whereby the slide block peg engages with the sliding block of the transmission lever 20 as well as with the sliding block of the actuation lever 24.

The actuation lever 24 can be swiveled around a swivel bearing $S_1$, which is affixed to the housing, relative to the handle 22, which is affixed to the housing. Here, a spring 34 is provided on the swivel bearing $S_1$, and this spring acts on the actuation lever 24 in such a way that the lever is swiveled away from the handle 22. In order to dispense the construction material 36 from the cartridge 12 (see FIG. 2), an operator has to swivel the actuation lever 24 against the force of the spring 34 in the direction of the handle 22. Since the actuation lever 24 is coupled via the sliding block guide 26 to the transmission lever 20, the latter is swiveled around a swivel bearing $S_2$, which is affixed to the housing and which is indicated in FIGS. 1 and 3, a process in which it actuates the advancing mechanism 14 of the dispenser 10.

The advancing mechanism 14 provided on the housing 18 engages with the piston rod 16, which is movably mounted in the housing 18 in the advancing direction R, and said advancing mechanism 14 forces the piston rod 16 in the advancing direction R. On the piston rod 16, there is a piston 38 that can be moved against a plunger of the cartridge 12 in order to dispense the construction material 36 contained in the cartridge 12 through a cartridge opening 39.

In the present case, the advancing mechanism 14 is a conventional ratchet mechanism, whereby the transmission lever 20 engages with a drive wheel 40 of the ratchet mechanism.

As an alternative, the advancing mechanism 14 can also comprise a clamping disc in a known manner, whereby the transmission lever 20 can engage with this clamping disc 140, which is shown solely schematically in dotted form and extends around piston rod 16. Since the configuration of the advancing mechanism 14 is largely immaterial for the present invention, the precise construction of the advancing mechanism 14 is not elaborated upon in greater detail here.

Relative to the swivel bearing $S_1$, which is affixed to the housing, the sliding block or the slot 30 of the swiveling actuation lever 24 extends along the actuation lever 24 essentially in the radial direction.

Analogously, relative to the swivel bearing $S_2$, which is affixed to the housing, the sliding block or the slot 28 of the swiveling transmission lever 20 extends essentially in the radial direction along the transmission lever 20.

Figure 2:
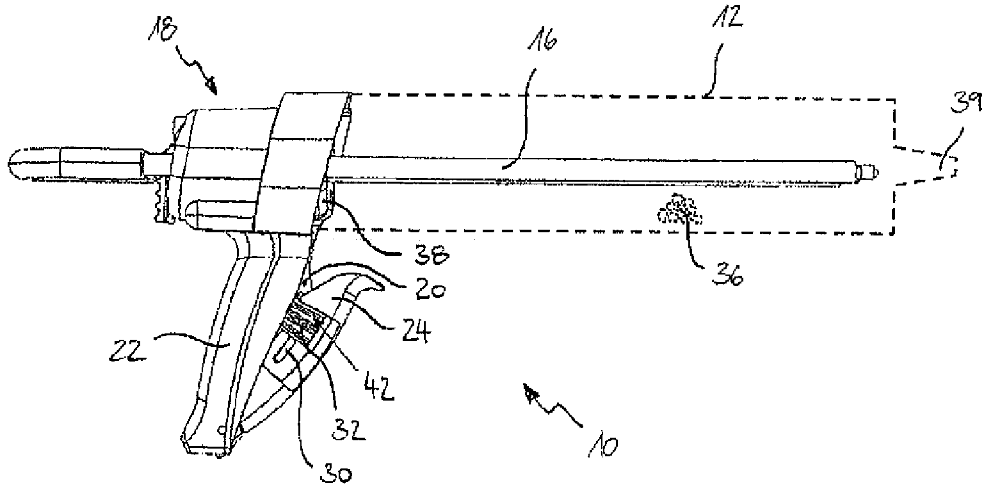
FIG. 2 a side view of the dispenser according to the invention as shown in FIG. 1.
Figure 4:
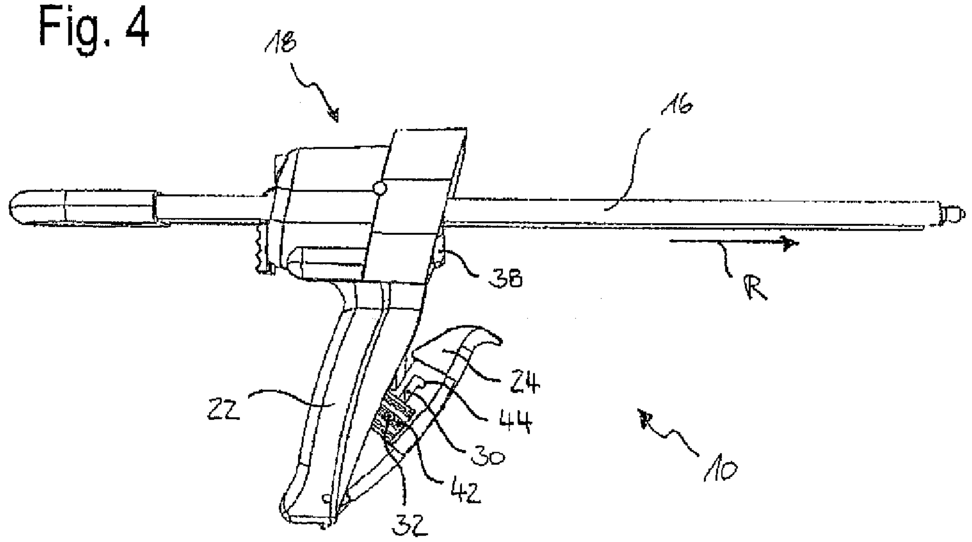
FIG. 4 a side view of the dispenser according to the invention as shown in FIG. 3.

In the two views of the dispenser 10 according to FIGS. 2 and 4, it can be clearly seen that the swiveling actuation lever 24 has an adjusting slide 42 that, relative to the swivel bearing $S_1$ of the actuation lever 24, which is affixed to the housing, can be moved manually by the user between a radially outer, first adjustment position (see FIG. 2), and a radially inner, second adjustment position (see FIG. 4).

According to the sectional views of FIGS. 1 and 3, the adjusting slide 42 comprises the slide block peg of the sliding block guide 26, which is configured as a guide pin 32. The actuation lever 24 is then coupled to the transmission lever 20 via the sliding block guide 26 in such a way that, when the adjusting slide 42 is moved out of its first adjustment position according to FIGS. 1 and 2 into its second adjustment position according to FIGS. 3 and 4, the guide pin 32 moves away from the swivel bearing $S_2$ of the transmission lever 20, which is affixed to the housing.

As a result, a lever arm x on the transmission lever 20 lengthens from a value $x_1$ to a value $x_2$.

If the same construction material 36 is used, then the larger lever arm $x_2$ according to FIG. 3 means that a lower exertion of force dispenses a smaller amount of construction material per stroke, whereas the smaller lever arm $x_1$ according to FIG. 1 means that a greater exertion of force dispenses a larger amount of construction material per stroke. The term "stroke" refers to a swiveling movement of the actuation lever 24 from its shown, spring-loaded end position into its opposite end position in which it has been swiveled in the direction of the handle 22.

Thus, the radially outer, first adjustment position of the adjusting slide 42 according to FIGS. 1 and 2 is recommended for fairly low-viscosity construction materials having a low dispensing resistance, since in this case, the operator achieves a fast dispensing of the contents of the cartridge 12 with a small number of strokes.

In contrast, the radially inner, second adjustment position of the adjusting slide 42 according to FIGS. 3 and 4 is recommended for fairly high-viscosity construction materials 36 having a high dispensing resistance, since in this case, the operator achieves a dispensing of the contents of the cartridge 12 with an acceptable amount of force.

In FIGS. 3 and 4, it can be seen that the sliding block of the actuation lever 24, which is configured as a slot 30, has an undercut 44, with which the guide pin 32 can engage. In a few embodiment variants of the dispenser 10, the slide block peg is pre-tensioned by a spring element perpendicular to its sliding block path in the direction of the undercut 44, so the slide block peg latches in the undercut 44 when it reaches said undercut 44.

Due to such an undercut 44, the adjusting slide 42 can be locked in an adjustment position. In the present case, the adjusting slide 42 can be affixed in its radially outer, first adjustment position by the undercut 44. Of course, it is also conceivable for the sliding block of the actuation lever 24, which is configured as a slot 30, to have additional undercuts, for example, so that the adjusting slide 42 can be locked, for example, in its radially inner, second adjustment position or in an intermediate position.

Due to the sliding block guide 26, the volume of construction material dispensed per stroke can be varied simply and quickly by manually actuating the adjusting slide 42. At the same time, the construction comprising the sliding block guide 26 and the adjusting slide 42 is very sturdy, so that the dispenser 10 has a very durable functionality and a long service life, provided that it is operated properly.

What is claimed is:

1. A dispenser for dispensing content of a cartridge, comprising:

an advancer for a piston rod;

a housing, a transmission lever for actuating the advancer is attached on the housing so as to swivel;

a handle fixed with respect to the housing; and an actuation lever attached to the handle so as to swivel, the transmission lever and the actuation lever are connected to each other via a sliding block guide; wherein the sliding block guide comprises a sliding block in the transmission lever, a sliding block in the actuation lever, and a slide block peg, the slide block peg engaging with the sliding block of the transmission lever as well as with the sliding block of the actuation lever.

2. The dispenser as recited in claim 1, wherein the slide block peg is configured as a guide pin and the sliding blocks in the transmission lever and the actuation lever are configured as slots.

3. The dispenser as recited in claim 1, wherein the sliding block in the actuation lever, relative to a swivel bearing of the actuation lever fixed with respect to the housing, extends in a radial direction along the actuation lever.

4. A dispenser for dispensing content of a cartridge, comprising:

an advancer for a piston rod;

a housing, a transmission lever for actuating the advancer is attached on the housing so as to swivel;

a handle fixed with respect to the housing; and an actuation lever attached to the handle so as to swivel, the transmission lever and the actuation lever are connected to each other via a sliding block guide; wherein the actuation lever has an adjusting slide, the adjustable slide, relative to a swivel bearing of the actuation lever fixed with respect to the housing, is movable between a radially outer, first adjustment position and a radially inner, second adjustment position; wherein the adjusting slide comprises a slide block peg of the sliding block guide.

5. The dispenser as recited in claim 4, wherein the sliding block guide includes sliding block peg and a sliding block of the actuation lever having an undercut, the slide block peg engageable with the undercut.

6. The dispenser as recited in claim 4, wherein the actuation lever is coupled to the transmission lever via the sliding block guide in such a way that, when the adjusting slide is moved from a first adjustment position into a second adjustment position, the slide block peg moves away from a swiveling bearing of the transmission lever fixed with respect to the housing.

* * * * *